(No Model.) 2 Sheets—Sheet 1.

T. GRIFFIN.
COTTON CULTIVATOR.

No. 387,589. Patented Aug. 7, 1888.

Witnesses.

Inventor,
Theophilus Griffin
By his Attorneys (No Model.) 2 Sheets—Sheet 2.

T. GRIFFIN.
COTTON CULTIVATOR.

No. 387,589. Patented Aug. 7, 1888.

Witnesses.
C. S. Taylor,
J. W. Garner

Inventor,
Theophilus Griffin
By his Attorneys
C. A. Snow & Co.

United States Patent Office.

THEOPHILUS GRIFFIN, OF SHERIDAN, ARKANSAS, ASSIGNOR OF TWO-THIRDS TO JOSEPH S. WILLIAMS AND HENRY BALES, OF SAME PLACE.

COTTON-CULTIVATOR.

SPECIFICATION forming part of Letters Patent No. 387,589, dated August 7, 1888.

Application filed November 29, 1887. Serial No. 256,444. (No model.)

*To all whom it may concern:*

Be it known that I, THEOPHILUS GRIFFIN, a citizen of the United States, residing at Sheridan, in the county of Grant and State of Arkansas, have invented a new and useful Improvement in Cotton-Cultivators, of which the following is a specification.

My invention relates to an improvement in combined cotton cultivators, choppers, scrapers, and fenders; and it consists in the peculiar construction and combination of devices, that will be more fully set forth hereinafter, and particularly pointed out in the claims.

Figure 1:
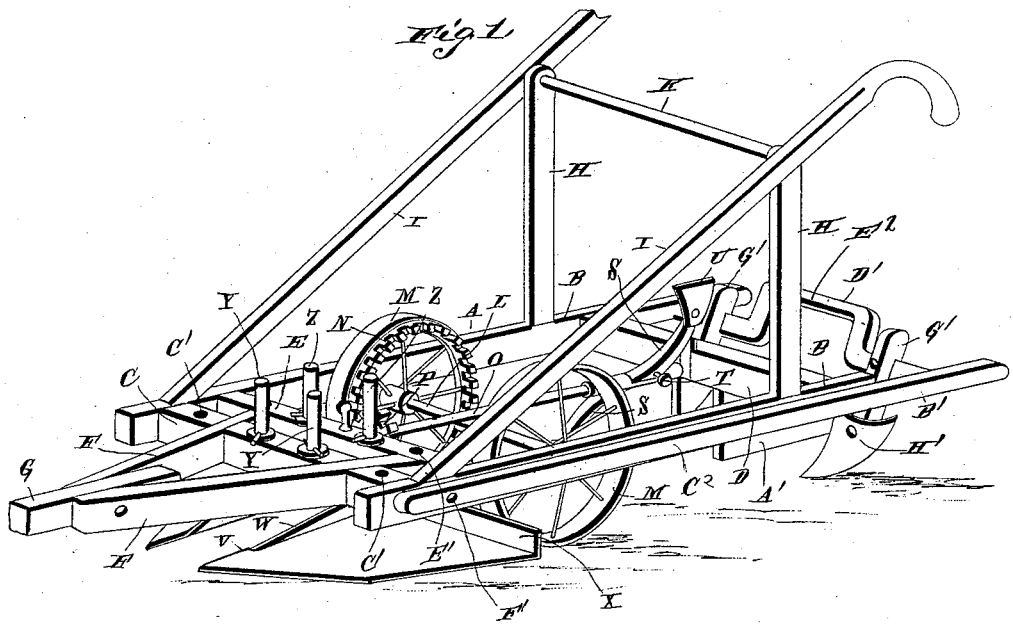
Figure 2:
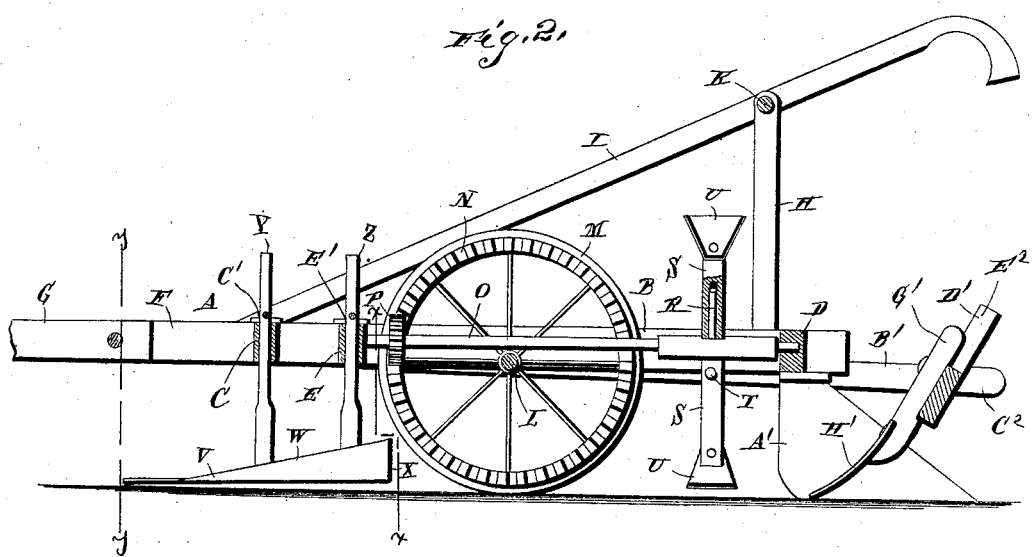
Figure 3:
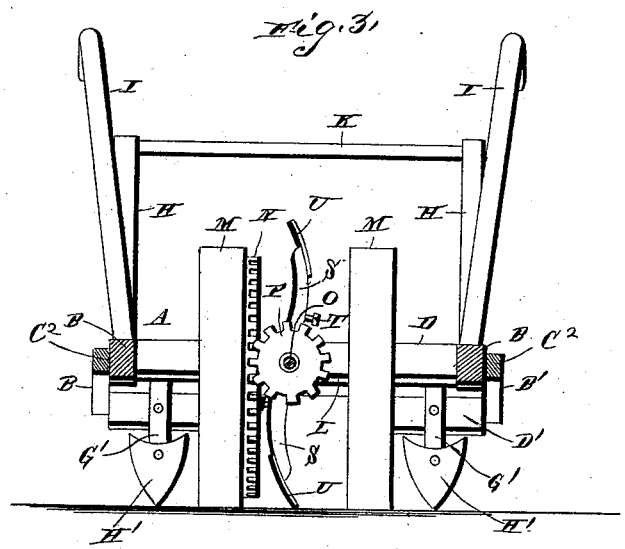
Figure 4:
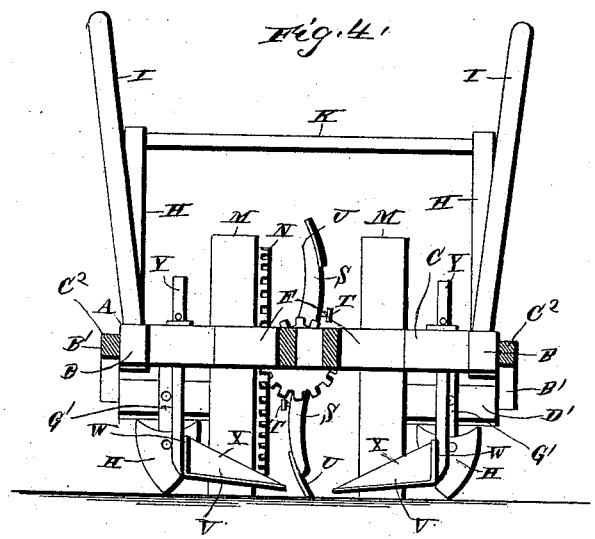

In the accompanying drawings, Figure 1 is a perspective view of a machine embodying my improvements. Fig. 2 is a vertical longitudinal central sectional view of the same. Fig. 3 is a vertical transverse sectional view taken on the line $x\ x$ of Fig. 2. Fig. 4 is a similar view taken on the line $y\ y$ of Fig. 2.

A represents the main frame, which comprises a pair of longitudinal side bars, B, a front cross-bar, C, a rear cross-bar, D, and a cross-bar, E, arranged at a suitable distance in rear of the bar C.

F represents a pair of hounds, which are attached to the bars C and E, project forward in advance of the frame, and serve for the attachment of the draft-pole or tongue G. From the upper sides of the bars B, near the rear ends thereof, project vertical standards H.

I represents a pair of handles, which have their front ends attached to the front ends of the beams B, and are also attached to the ends of a rung, K, the extremities of which pass through openings near the upper ends of standards H.

L represents a transverse shaft, which is journaled in suitable bearings secured to the beams B near the center thereof. To this shaft is rigidly attached a pair of rollers, M, which are arranged on opposite sides of the center of the bars E and D. Near the front end of a shaft, O, is a pinion, P, which meshes with the teeth N, and thereby the said shaft is caused to rotate when the machine advances. Spindles R project from opposite sides of the shaft O near the rear end thereof.

S represents a pair of chopping-arms, which are curved, as shown, and have openings or sockets in their inner ends adapted to receive the spindles. The said arms are further provided with set-screws T, which are adapted to bear against the spindles, and thereby secure the arms thereto at any desired angle with relation to the shaft O. To the free ends of the arms S are secured chopping-hoes U. By turning the arms S on the spindles the chopping-hoes may be caused to operate in the ground obliquely at any desired angle with relation to the line of draft.

The cross-bar C is provided with a series of vertical openings, C', and the cross-bar E is provided with similar openings, E'.

V represents a pair of shovels, which are arranged nearly in a horizontal position, and have their outer edges curved and their inner edges provided with vertical plates W. The rear ends of the said shovels are bent upward to form the vertical rear sides, X, which are connected to the vertical plates W. Rods Y are attached to the plates W, near the front ends thereof, and extend vertically therefrom, the said rods being adapted to pass upward through two of the openings C' in the bar C, and thereby suspend the shovels at any desired position apart. From the rear ends of the plates W project vertical rods Z, which are similar to the rods Y, and are adapted to pass up through two of the openings E' in the bar E, and thereby secure the rear ends of the shovels at any desired distance apart. When the shovels are arranged as shown in Fig. 1, with their vertical plates W on their inner opposing sides, the said shovels are adapted to scrape the earth from opposite sides of the row of plants, as will be readily understood; but when the said shovels are arranged with their curved edges toward each other and the plates W on their outer sides, they are adapted to throw the dirt on opposite sides of the row of plants toward the said plants so as to ridge up the same. The rods Y and Z are movable vertically in the openings in bars C and E, and thereby are adapted to secure the shovels at any desired distance below the frame.

A' represents a pair of vertical fender-boards, which are attached to the under side of the beam D at suitable distances from the center therefrom and project rearwardly therefrom.

B' represents a cultivator-frame, which comprises the bars C' and the cross bar D', connecting the rear ends thereof, the central portion of the said bar D' being arched, as at E'. The front ends of the bars C' are pivoted to the front ends of the bars B on the outer sides thereof by means of bolts F', and thereby the rear end of the cultivator-frame is adapted to be raised or lowered.

G' represents a pair of standards, which are secured to the cross-bar D', are laterally adjustable thereon, and to the lower ends of these standards are attached cultivating-shovels H', which are arranged on the outer sides of the fender-boards A'.

The operation of my invention is as follows: In order to scrape, chop, and cultivate the cotton, the shovels D are arranged, as indicated in Figs. 1, 2, and 3, with their vertical plates W on their inner opposing sides, and the machine is drawn forward astride the row of plants and so directed that the shovels, rollers, and fenders are caused to move on opposite sides of the row of plants. The shovels V serve to scrape the plants and to throw the earth from the same, the rollers press the earth firmly on opposite sides of the plants, and the teeth M of one of the rollers, by meshing with the pinion O, impart rotation to the said shaft, so as to cause the chopping-hoes to chop out the plants at suitable regular intervals. The cultivating-shovels attached to the cultivating-frame stir the soil on opposite sides of the row of plants, and thereby promote the growth thereof, and the fenders prevent the earth from being thrown against the young and tender plants and injuring them. When it is desired to form ridges or earth up the plants after they have attained a considerable size, the shaft O is removed from the machine and the shovels V are arranged so that their curved edges are opposite each other, as before described. If it is not desirable at all times to have the cultivating-shovels H' at work while the cotton is being scraped or ridged, the rear end of the frame B' may be readily raised so as to prevent the shovels H' from working in the earth.

Having thus described my invention, I claim—

1. The combination of the frame A and the horizontally-arranged shovels V, supported under the said frame and detachably and reversibly connected thereto, the said shovels having one side curved outward, as shown, and having the other side provided with the vertical plate W, the rear end of each shovel being turned upward to form the vertical plate X, connected to the rear end of plate W, substantially as described.

2. The combination, in a cotton chopper and cultivator, of the frame A, having the vertically-adjustable shovels or scrapers at its front end, the chopping mechanism provided at its rear end with the fenders A', and the frame B', having its front end pivoted to frame A and carrying at its rear end the cultivating-shovels arranged on the outer sides of the fenders, the said rear end of the cultivating-frame being vertically movable, for the purpose set forth, substantially as described.

In testimony that I claim the foregoing as my own I have hereto affixed my signature in presence of two witnesses.

THEOPHILUS GRIFFIN.

Witnesses:
J. J. BEAVER,
HENRY BALES.